(12) United States Patent
Lim et al.

(10) Patent No.: US 9,865,914 B2
(45) Date of Patent: Jan. 9, 2018

(54) MULTI-POSITION DISPLAY DECK AND ANTENNA

(71) Applicant: Hewlett-Packard Development Company, L.P., Houston, TX (US)

(72) Inventors: Hui Leng Lim, Houston, TX (US); Leo J Gerten, Houston, TX (US); Shih-Huang Wu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 14/765,320

(22) PCT Filed: Jan. 31, 2013

(86) PCT No.: PCT/US2013/023994
§ 371 (c)(1),
(2) Date: Jul. 31, 2015

(87) PCT Pub. No.: WO2014/120170
PCT Pub. Date: Aug. 7, 2014

(65) Prior Publication Data
US 2015/0380804 A1    Dec. 31, 2015

(51) Int. Cl.
*H01Q 1/22*        (2006.01)
*G06F 1/16*        (2006.01)

(52) U.S. Cl.
CPC .......... *H01Q 1/2266* (2013.01); *G06F 1/162* (2013.01); *G06F 1/1637* (2013.01); *G06F 1/1654* (2013.01); *G06F 1/1662* (2013.01); *G06F 1/1677* (2013.01); *G06F 1/1684* (2013.01); *G06F 1/1698* (2013.01)

(58) Field of Classification Search
CPC ................................................... H01Q 1/2266
See application file for complete search history.

(56) References Cited

U.S. PATENT DOCUMENTS

| 5,644,320 A | 7/1997 | Rossi |
| 7,046,204 B2 | 3/2006 | Satoh et al. |
| 2006/0276221 A1 | 12/2006 | Lagnado et al. |
| 2008/0266198 A1 | 10/2008 | Walker et al. |

(Continued)

FOREIGN PATENT DOCUMENTS

| EP | 1079296 A2 | 2/2001 |
| EP | 0791978 B1 | 4/2003 |

(Continued)

OTHER PUBLICATIONS

"ProCurve Networking Antenna Deployment Technical Brief," 2009, pp. 1-11, Hewlett-Packard Development Company, L.P.

(Continued)

*Primary Examiner* — Graham Smith
(74) *Attorney, Agent, or Firm* — Rathe Lindenbaum LLP (57) ABSTRACT

A display (122, 622, 722) comprising a display screen (142, 742) is repositionable with respect to a deck (20, 120, 220, 520, 720) comprising keys (24, 724). The display (122, 622, 722) is repositionable between a raised position and a lowered horizontal position. An antenna (28, 528, 628, 728) is located within the deck (20, 120, 220, 520, 720) at a location outwardly beyond the display (122, 622, 722) when the display (122, 622, 722) is in the lowered horizontal position.

13 Claims, 9 Drawing Sheets

(56) References Cited

U.S. PATENT DOCUMENTS

2010/0321255 A1* 12/2010 Kough ................ H01Q 1/2266
                                                                343/702
2011/0115735 A1    5/2011  Lev et al.
2012/0155005 A1    6/2012  Lee

FOREIGN PATENT DOCUMENTS

EP           1202378 B1    12/2005
WO       WO-00/55704 A2     9/2000

OTHER PUBLICATIONS

Eugene Kim, "Zagg ZAGGkeys PROplus (for iPad)," Dec. 7, 2012, pp. 1-4, PCMag.com.
International Search Report and Written Opinion, International Application No. PCT/US2013/023994, dated Oct. 29, 2013, pp. 1-10.

* cited by examiner

FIG. 17

MULTI-POSITION DISPLAY DECK AND ANTENNA

Computing devices are sometimes provided with antennas to facilitate wireless communication. The housings or the internal components of the computing devices are often metallic. The metallic housings or the metallic internal components may detune the antenna and reduce performance of the antenna.

DETAILED DESCRIPTION OF THE EXAMPLE EMBODIMENTS

Figure 1:
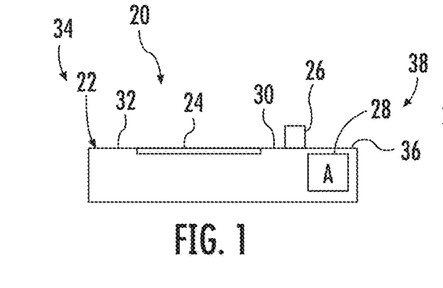
FIG. 1 is a side view schematically illustrating an example computing device deck.

FIG. 1 schematically illustrates an example computing device deck 20 configured to support a display in multiple positions such that the display may be positioned in a raised notebook orientation with the display extending upwardly from the deck and may also alternatively be positioned in a lowered tablet orientation in which the display is connected to the deck while horizontally extending over the deck with the display screen facing upwardly away from the deck. As will be described hereafter, computing device deck 20 is configured to house an antenna such that performance of the antenna is maintained when the deck is supporting the display in the lowered horizontal tablet orientation. Deck 20 comprises housing 22, keys 24, mount 26 and antenna 28.

Housing 22 comprises an enclosure about electronics associated with computing device deck 20. Housing 22 comprises a first housing portion 30 extending about keys 24 and forming a palm rest area 32 proximate a front end 34 of deck 20. Housing 22 further comprises a second housing portion or extension 36 at a rear end 38 of deck 20 extending on an opposite side of mount 26 as keys 24 and palm rest 32. Housing extension 36 extends about antenna 28. Housing extension 36 is formed from a radiofrequency (RF) transparent material in regions adjacent to or about antenna 28. In one implementation, housing extension 36 is formed from a polymer. In one implementation, housing portion 30 is also formed from an RF transparent material, such as a polymer. In other implementations, housing portion 30 may be formed from a material that is not RF transparent, such as a metal.

Keys 24 extends along an upper surface of housing portion 30 of deck 20 between mount 26 and the front end 34 of deck 20. In one implementation, keys 24 comprise a QWERTY key layout. In other implementations, keys 24 may be arranged in other layout. In one implementation, keys 24 comprise depressible keys. In another implementation, keys 24 may receive input through touch sensors, optical sensors or the like. In some implementations, keys 24 may be projected in front of mount 26 or onto housing portion 30 of deck 20.

Mount 26 (schematically shown) comprises a mechanism configured to selectively retain and support a display in multiple positions such that the display may be positioned in a raised notebook orientation in which the display extends upwardly from the deck and may also be positioned in a lowered tablet orientation in which the display table is connected to the deck while horizontally extending over the deck with the display screen facing upwardly away from the deck. In one of implementation, mount 26 comprises a hinge and swivel mechanism extending from deck 20 at a location between antenna 28 and front end 34. In such an implementation, mount 26 connects to the display so as to allow the display to be moved between the raised notebook orientation and the lowered tablet orientation all while the display remains connected and attached to deck 20. In another implementation, mount 26 comprises a releasable retainer mechanism, such as a snap or releasable locking mechanism, that allows the display to be disconnected and separated from deck 20 and allows separated display 22 be reconnected and retained in with respect to deck 20 in either the raised notebook orientation or the lowered tablet orientation. In one implementation, the selective reconnection of the display in either of the notebook and tablet orientations may be performed without the use of tools.

Antenna 28 comprises a device to receive and transmit wireless signals for the transmission of data to and from the computing device formed by deck 20. In one implementation, antenna 36 comprises a radiofrequency (RF) antenna. In one implementation, antenna 36 configured for use in a wireless local area network (WLAN). In one implementation, antenna 36 is also configured for use in a wireless wide area network (WWAN). Antenna 36 is supported within housing extension 36 of deck housing 20 such that antenna 36 extends outwardly beyond any display that is retained by mount 26 in the tablet orientation. In one implementation, antenna 36 is completely surrounded and enclosed by housing extension 36. In another implementation, antenna is at least partially exposed through walls of housing extension 36. Because deck 20 supports antenna 36 at a location outwardly beyond the display when the display is supported by mount 26 in the lowered horizontal tablet orientation or position, antenna 36 is not covered by display and performance of antenna 36 is not degraded by metallic or other RF blocking materials of the display screen. In addition, antenna 36 is not sandwiched between the display and any underlying RF blocking housing walls or electronics proximate palm rest 32 or other portions of deck 20.

Figure 2:
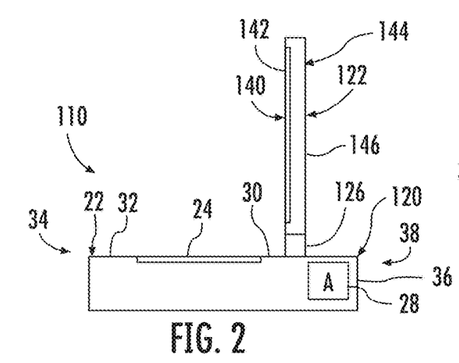
FIG. 2 is a side view of an example computing system with one implementation of the deck of FIG. 1 and a display in a notebook orientation.

FIG. 2 schematically illustrates an example computing system 110. Computing system 110 comprises deck 120 and display 22. Deck 120 is similar the deck 20 except that deck 120 specifically includes mount 126 in place of mount 26. Those remaining components of deck 120 which correspond to components of deck 20 are numbered similarly.

Mount 126 specifically comprises a hinge and swivel mechanism extending from deck 120 at a location between antenna 28 and front end 34. Mount 126 retains and supports display 122 in multiple positions such that the display 122 may be positioned in a raised notebook orientation in which the display 122 extends upwardly from the deck 120 and may also alternatively be positioned in a lowered tablet orientation in which the display 122 is connected to the deck 120 while horizontally extending over the deck 120 with its display screen facing upwardly away from deck 120. Mount 126 allows the display 122 to be moved between the raised notebook orientation and the lowered tablet orientation all while the display 122 remains connected and attached to deck 120. In one implementation, mount 126 allows display 122 to rotate or swivel about a vertical axis and to rotate or swivel about a horizontal axis.

As with mount 26, mount 126 extends from deck 120 between front end 34 and rear end 38 and between keys 24 and antenna 28. As a result, mount 126 minimally interferes with the performance of antenna 28, even when mount 126 includes one or more metallic or other RF blocking components. Likewise, display 122, regardless of whether display 122 is in a notebook orientation or a tablet orientation, minimally interferes with the performance of antenna 28. In one implementation, a rearward most side of mount 126 is located forwardly (towards palm rest 32) of the rear end 38 of deck 120 by at least 15 mm.

Display 122 comprises a panel comprising a front or top face 140 with a display screen 142 and a rear face 144 comprising a rear display housing 146. Display 122 is movably connected to deck 120 by mount 126 at a location forward of rear end 38 of deck 122, between antenna 28 and keys 24. In one implementation, display screen 142 comprises a liquid crystal display. In other implementations, display screen 142 may comprise other video display technologies. In the example illustrated, rear display housing 146 on rear face 144 is formed from a metallic material. In yet other implementations, rear display housing 146 may be formed from other materials.

Figure 3:
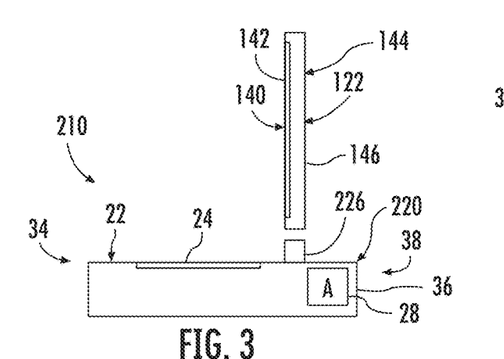
FIG. 3 is a side view of another example computing system with one implementation of the deck of FIG. 1 and the display separated from the deck.

FIG. 3 schematically illustrates computing system 210, another implementation of computing system 110. Computing system 210 is similar to computing system 110 except that computing system 210 includes deck 220 in place of deck 120. Deck 220 is similar to the deck 20 except that deck 220 specifically includes mount 226 in place of mount 26. Those remaining components of deck 220 which correspond to components of deck 20 are numbered similarly.

Mount 226 specifically comprises a releasable retainer mechanism, such as a snap or releasable locking mechanism, that allows the display 122 to be disconnected and separated from deck 220 and allows the separated display 122 be reconnected to deck 220 in either the raised notebook orientation or the lowered tablet orientation. In one implementation, mount 226 allows display 122 to be "clicked" or "snapped" into place in either of the raised notebook orientation or the lowered tablet orientation. In the lowered tablet orientation, display 122 horizontally extends over a top portion of deck 220, extending parallel to deck 220 with screen 142 facing upwardly perpendicularly away from deck 220. In one implementation, the selective reconnection of the display 122 in either of the notebook and tablet orientations may be performed without the use of tools.

As with mount 26, mount 226 extends from deck 120 between front end 34 and rear end 38 and between keys 24 and antenna 28. As a result, mount 226 minimally, if at all, interferes with the performance of antenna 28, even when mount 126 includes one or more metallic or other RF blocking components. Likewise, regardless of whether display 122 is in a notebook orientation or a tablet orientation, display 122 minimally interferes with the performance of antenna 28. In one implementation, a rearward most side of mount 226 is located forwardly (towards palm rest 32) of the rear end 38 of deck 120 by at least 15 mm.

Figure 4:
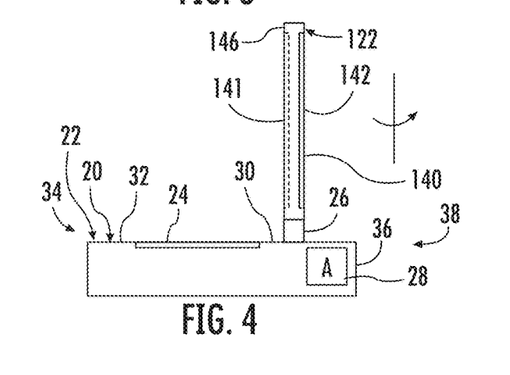
FIG. 4 is a side view of the computing system of FIG. 1 supporting a display in a rear viewing orientation.

FIG. 4 schematically illustrates deck 20 with mount 26 supporting display 122 in rear viewing position in which panel 122 is in a raised position and with display screen 142 facing rearwardly, away from front end 34. In implementations where mount 26 is similar mount 126, mount 26 facilitates rotation of display 122 about a vertical axis from the position shown in FIG. 2 to the position shown in FIG. 4 while display 122 remains connected to deck 20. In implementations where mount 26 similar to mount 226, mount 26 facilitates separation of display 122 and reattachment of display 122 to mount 26 in the position shown in FIG. 4. In the position shown in FIG. 4, display screen 142 may be used to present information to others while a person continues to provide commands or input through keys 24 behind display 122. In some implementations, display 122 may include an additional display screen 141 (schematically shown broken lines) along face 146, allowing a person to view the additional display screen 141 while presenting upon display screen 142 (or vice-versa).

Figure 5:
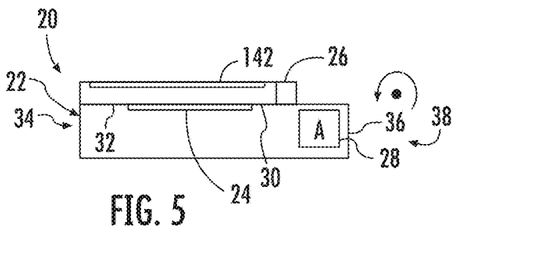
FIG. 5 a side view of the computing system of FIG. 1 supporting the display in a tablet position.
Figure 6:
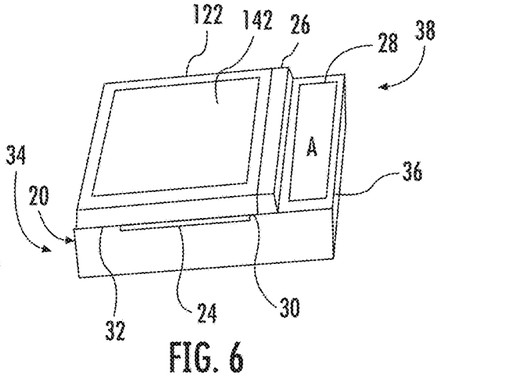
FIG. 6 is a rear perspective view of the computing system of FIG. 5.

FIGS. 5 and 6 schematically illustrate deck 20 with mount 26 supporting display 122 in a tablet orientation with the display 122 in a lowered horizontal position extending over deck 20 and with display screen 142 facing away from deck 20. In implementations where mount 26 is similar mount 126, mount 26 facilitates rotation of display 122 about a horizontal axis from the position shown in FIG. 4 to the position shown in FIG. 5 while display 122 remains connected to deck 20. In implementations where mount 26 similar to mount 226, mount 26 facilitates separation of display 122 and reattachment of display 122 to mount 26 in the position shown in FIG. 5.

As shown by FIGS. 5 and 6, in the tablet orientation, display 122 overlaps keys 24 while display screen 142 faces upwardly. At the same time, antenna 28 (schematically shown) is exposed for RF transmission. In one implementation, antenna 28 is physically exposed on a surface of housing portion 36. In another implementation, antenna 28 is functionally exposed by being enclosed within an RF transparent enclosure of housing portion 36. Any metallic components or materials of display 122 or of those portions of deck 20 forward of mount 26 do not substantially interfere with the receipt and transmission of radiofrequency signals by antenna 28. As a result, performance of the antenna is maintained when the deck is supporting the display in the lowered tablet orientation.

Figure 7:
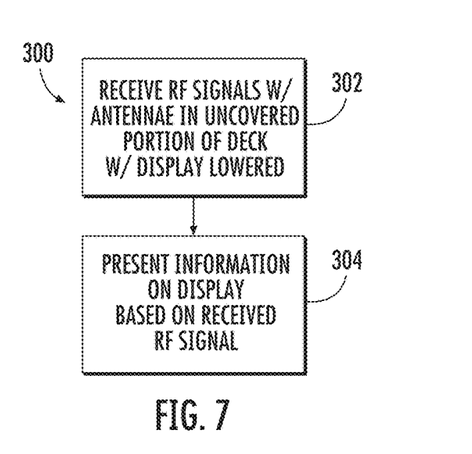
FIG. 7 is a flow diagram of an example method that may be carried out by the computing system of FIG. 2 or FIG. 3.

FIG. 7 is a flow diagram illustrating one example method 300 for use of a computing system 110 or computing system 210. As indicated by step 302, radiofrequency signals are received with an antenna located in or supported by an uncovered portion of the deck 20 while deck 20 is lowered. Radiofrequency signals may also be transmitted using the antenna located in or supported by the uncovered portion of deck 20. Because the antenna is supported within an uncovered portion of the deck, performance of the antenna is maintained when the deck is supporting the display in the lowered or lowered tablet orientation. As indicated by step 304, information is displayed or presented on display 20 using or based upon the received radiofrequency signals.

Figure 8:
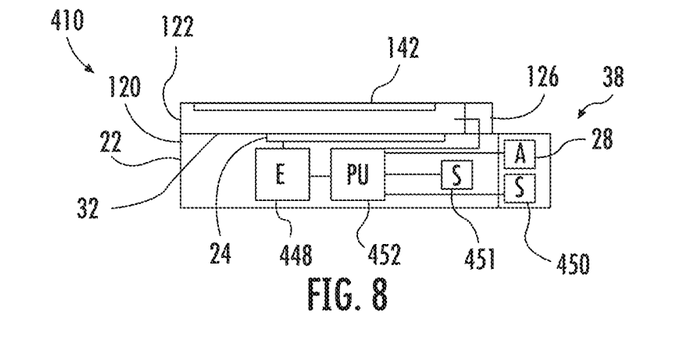
FIG. 8 is a side view schematically illustrating an example implementation of the computing system of FIG. 2.

FIG. 8 schematically illustrates computing system 410, a particular implementation of computing system 110, in a lowered horizontal position or tablet orientation. Computing system 410 is similar to computing system 110 except that computing system 410 is additionally illustrated as specifically comprising deck electronics 448, sensor 450, sensor 451 and processing unit 452. Those remaining components of computing system 410 which correspond to components of computing system 110 are numbered similarly. Although computing system 410 is illustrated as including mount 126, in other implementations computing system 410 may alternatively utilize mount 226 in place of mount 126.

Deck electronics (schematically shown) comprise electronics enclosed within housing 22. Such deck electronics may comprise one or more printed circuit boards, a battery, a hard disk drive and the like. Such deck electronics 448 include one or more metallic RF blocking or interfering components.

Sensor 450 comprises one or more proximity sensors enclosed within rear housing portion 36 that sense proximity of object or a person to antenna 28 at the rear end 38 of deck 20. Sensor 451 comprises one or more sensors that detect the positioning or state of display 122. For example, in one implementation, sensor 451 may include one or more optical sensors or one or more limit switches. In yet other implementations, sensor 451 may comprise other types of sensors.

Processing unit 452 comprise one or more processing units configured to direct the operation of deck electronics 448 and to generate control signals directing the operation of display 122 and antenna 28 based at least in part upon signals received from sensor 450 and sensor 451. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a non-transient computer-readable medium such as a random access memory (RAM) for execution by the processing unit from a read only memory (ROM), a mass storage device, or some other persistent storage. In other embodiments, hard wired circuitry may be used in place of or in combination with software instructions to implement the functions described. For example, processing unit 452 may be embodied as part of one or more application-specific integrated circuits (ASICs). Unless otherwise specifically noted, the processing unit is not limited to any specific combination of hardware circuitry and software, nor to any particular source for the instructions executed by the processing unit.

When operating under a first mode of operation, processing unit 452 is configured to adjust the operation of antenna 28 based upon the proximity of one or more persons to antenna 28. For example, in response to receiving signals from sensor 450 indicating proximity of one or more persons within a predefined range of antenna 28 (or rear end 38 of deck 20), processing unit 448 may generate control signals causing dynamic power reduction of antenna 28 to reduce emitted radiation. In response to receiving signals from sensor 450 (or the lack thereof) indicating that persons are not or are no longer within a predefined range or distance from of antenna 28 or rear end 38, processing unit 448 may generate control signals increasing the power output of antenna 28 to increase its range or bandwidth. For example, when computing device 410 is in the tablet orientation or tablet mode, deck 20 may be rotated to various orientations where rear end 38 of deck 20 containing antenna 28 is close to a bottom of display screen 142 and closest to the person using computing device 410 or where rear end 38 of deck 20 is close to a top of the display screen 142 and most distant the person using the device 410. Based on the sense proximity, dynamic power of antenna 28 is automatically adjusted by processing unit 452.

When operating in a second mode of operation, processing unit 452 also generates control signals adjusting the operation of antenna 28 based upon signals from sensor 451. For example, in response to receiving signals from sensor 451 indicating that display screen 122 is in the raised orientation or notebook position (shown in FIG. 2) in which display screen 142 is facing forwardly towards palm rest 32, processing unit 452 (recognizing that the person using computing device 410 is most likely to be at the front end 34 of deck 20 for viewing display screen 142) may generate control signals automatically actuating antenna 28 to a higher power mode for greater throughput and greater range. In one implementation, in response to signals indicating that display screen 122 is in the orientation shown in FIG. 2, processing unit 452 may additionally disable sensor 450 or reduce the sensing or polling frequency of sensor 450 to conserve battery power. In response to receiving signals from sensor 451 indicating that display screen 122 is alternatively in the rear viewing mode or position (shown in FIG. 4), processing unit 452 (recognizing that the person using computing device 410 is most likely to be at the rear end 38 of deck 20 for viewing display screen 142) may generate control signals automatically implement dynamic power reduction to actuate antenna 28 to a lower power mode. In one implementation, in response to signals indicating that display screen 122 is in the rear viewing orientation showing FIG. 4, processing unit 452 may additionally disable sensor 450 or reduce the sensing or polling frequency of sensor 450 to conserve battery power. In response to receiving signals from sensor 451 indicating that display screen 122 is in the horizontal tablet orientation (shown in FIGS. 5, 6 and 8), processing unit 452 may actuate sensor 450 or increase a sensitivity or polling frequency of sensor 450. When signals from sensor 451 indicate that display screen 122 is in the tablet orientation, processing unit 452 may control the operational state or power output of antenna 28 based upon signals additionally received from proximity sensor 450. In some implementations, sensor 451 may be omitted, wherein the operational state or power level of antenna 28 is controlled by processing unit 452 based upon signals from proximity sensor 450 irrespective of the positioning of display 122.

Figure 9:
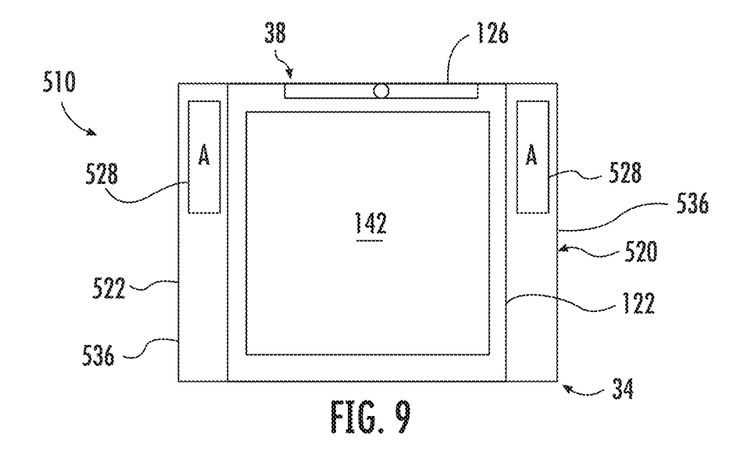
FIG. 9 is a top view of an example implementation of the computing system of FIG. 2.

FIG. 9 is a top view of computing system 510, a particular implementation of computing system 110, in a lowered horizontal position or tablet orientation. Computing system 410 is similar to computing system 410 except that computing system comprises deck 520 and antennas 528 in lieu of deck 20 and antenna 28. Those remaining components of computing system 510 which correspond to components of computing system 410 are numbered similarly. Although computing system 510 is illustrated as including mount 126, in other implementations computing system 510 may alternatively utilize mount 226 in place of mount 126.

Deck 520 is similar to deck 120 of computing system 410 except that deck 520 includes a housing 522 outwardly extending beyond display 122 in a transverse direction (rather than a longitudinal direction as shown in FIG. 6) when display 122 is in the lowered horizontal position (tablet orientation) and when display screen 142 is facing upwardly away from the underlying keys 24 of deck 520. In the example illustrated, rear end 38 of deck 520 extends adjacent to mount 126, not extending rearwardly of mount 126. Housing 522 comprises left and right transverse housing portions 536 which are not covered by display 122 when display 122 is in the tablet orientation. Transverse housing portions or extensions 536, like rear housing portion 36 described above, are formed from a radiofrequency (RF) transparent material in regions adjacent to or about antennas 528. In one implementation, housing extensions 536 are formed from a polymer.

Antennas 528 comprise a main antenna and an auxiliary antenna. Antennas 528 comprise devices to receive and transmit wireless signals for the transmission of data to and from computing system 510. In one implementation, antennas 528 each comprises a radiofrequency (RF) antenna. In one implementation, antennas 528 are configured for use in a wireless local area network (WLAN). In one implementation, antennas 528 are also configured for use in a wireless wide area network (WWAN). Antennas 528 are supported within housing extensions 536 of deck housing 520 such that antennas 528 extend outwardly beyond display 122 when in the tablet orientation. In the example illustrated, antennas 528 are located proximate rear end 38 of housing 520, away from a person when the person is using computing system 510 in the raised notebook orientation (shown in FIG. 2). In one implementation, antennas 528 are completely surrounded and enclosed by housing extension 536. In another implementation, antennas 528 may be at least partially exposed through walls of housing extensions 536. Because deck 520 supports antennas 528 at locations outwardly beyond the display 122 when the display 122 is supported by mount 126 in the lowered horizontal tablet orientation or position, antennas 528 are not covered by display and performance of antennas 528 is not degraded by metallic or other RF blocking materials of the display screen. In addition, antennas 528 are not sandwiched between the display and any underlying RF blocking housing walls or electronics proximate palm rest 32 (shown in FIG. 8) or other portions of deck 520.

Figure 10:
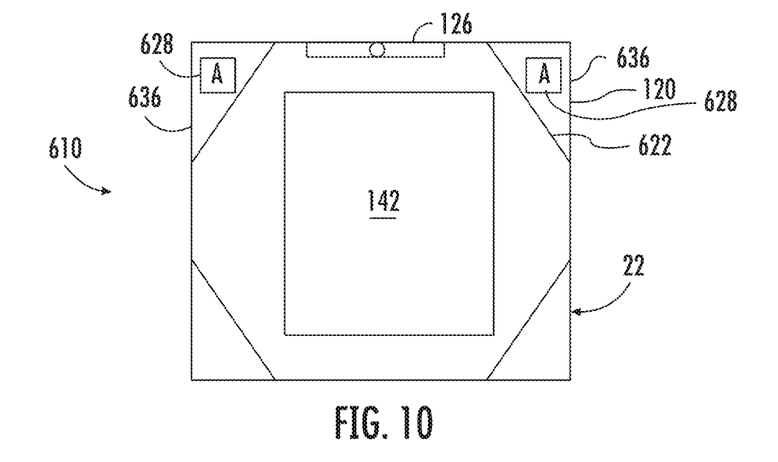
FIG. 10 is a top view of an example implementation of the computing system of FIG. 2.

FIG. 10 is a top view of computing system 610, a particular implementation of computing system 110, in a lowered horizontal position or tablet orientation. Computing system 610 is similar to computing system 410 except that computing system comprises display 622 and antenna 628 in lieu of display 122 and antenna 28. Those remaining components of computing system 610 which correspond to components of computing system 110 are numbered similarly. Although computing system 610 is illustrated as including mount 126, in other implementations, computing system 610 may alternatively utilize mount 226 in place of mount 126.

Display 622 is similar to display 122 except that display 122 is sized and shaped so as to not overlap (extend over) corners (corner extensions 636) of deck 120 when display 122 is in the tablet orientation in which display screen 142 facing upwardly away from the underlying keys 24 (shown in FIG. 8). Antennas 628 are similar to antennas 528 described above with respect to computing system 510 except that antennas 628 are supported in at least partially enclosed in the two corner extensions 636 of housing 22. In one implementation, antennas 628 are completely surrounded and enclosed by housing corner extension 636. In another implementation, each of antennas 628 may be at least partially exposed through walls of housing extensions 536. Because deck 120 supports antennas 628 at locations outwardly beyond the display 622 when the display 622 is supported by mount 126 in the lowered horizontal tablet orientation or position, antennas 628 are not covered by display and performance of antennas 628 is not degraded by metallic or other RF blocking materials of the display screen. In addition, antennas 628 are not sandwiched between the display and any underlying RF blocking housing walls or electronics proximate palm rest 32 (shown in FIG. 8) or other portions of deck 120.

FIGS. 11-17 illustrate computing system 710, an example implementation of computing system 410. Computing system 710 comprises deck 720 and display 722. Deck 720 comprises housing 722, keys 724, mount 726 and antennas 728A, 728B (collectively referred to as antennas 728 (shown in FIG. 17). In one implementation, deck 720 additionally comprises electronics 448, sensor 450, sensor 451 and processing unit 452 described above with respect to computing system 410.

Figure 11:
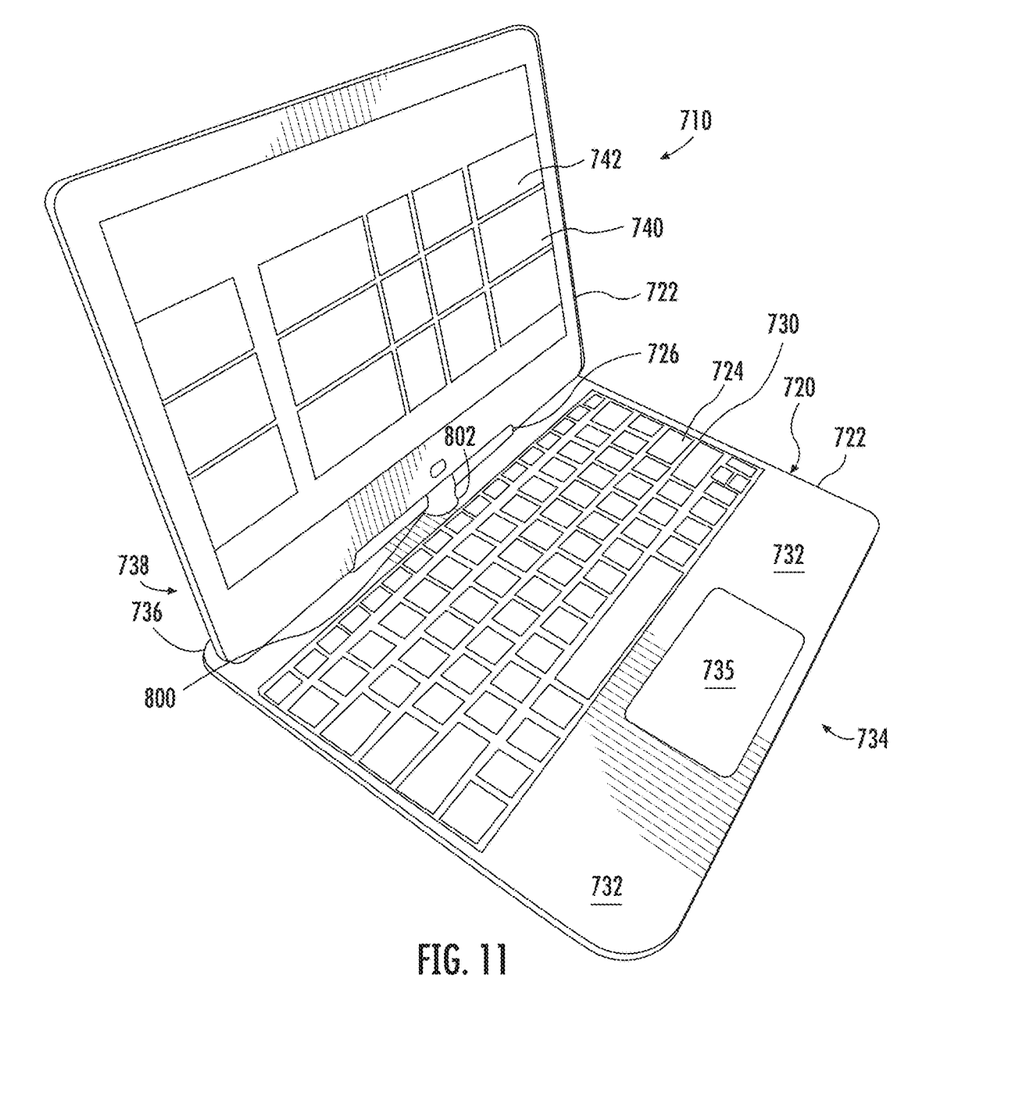
FIG. 11 is a front perspective view of an example implementation of the computing system of FIG. 2, illustrating an example display in a raised forward facing notebook position.

Housing 722 comprises an enclosure about electronics associate with computing device deck 720. Housing 722 comprises a first housing portion 730 extending about keys 724 and forming a palm rest area 732 proximate a front end 734 of deck 720 on opposite sides of a touchpad 735. Housing 722 further comprises a second housing portion or extension 736 at a rear end 738 of deck 720 that extends on an opposite side of mount 726 as keys 724 and palm rest 732. Housing extension 736 extends about antennas 728. In the example illustrated, housing extension 736 includes multiple rearwardly facing power or data communication ports 737 (shown in FIGS. 12 and 17). Housing extension 736 is formed from a radiofrequency (RF) transparent material in regions adjacent to or about antenna 728. In one implementation, housing extension 736 is formed from a polymer. In one implementation, housing portion 730 is also formed from an RF transparent material, such as a polymer. In other implementations, housing portion 730 may be formed from a material that is not RF transparent, such as a metal.

Keys 724 extends along an upper surface of housing portion 730 of deck 720 between mount 726 and the front end 734 of deck 720. In one implementation, keys 724 are arranged in a QWERTY key layout. In other implementations, keys 724 may be arranged in other layouts. In the example illustrated, keys 724 comprise depressible keys. In another implementation, keys 724 may receive input through touch sensors, optical sensors or the like. In some implementations, keys 724 may be projected in front of mount 726 or onto housing portion 730 of deck 720.

Mount 726 comprises a mechanism configured to selectively retain and support display 722 in multiple positions such that the display 722 may be positioned in a raised notebook orientation in which the display extends upwardly from the deck and may also alternatively be positioned in a lowered tablet orientation in which the display 122 is connected to the deck 720 while horizontally extending over the deck 720. In the example illustrated, mount 726 comprises a hinge and swivel mechanism extending from deck 720 at a location between antennas 728 and front end 734. Mount 726 includes a hinge portion 800 which pivotally supports display screen 722 for pivotal movement about a horizontal axis and a swivel portion 802 which supports display screen 722 (and hinge portion 800) for pivotal or rotational movement about a vertical axis. Mount 726 connects to the display 722 so as to allow the display 722 to be moved between a raised forward facing notebook orientation (shown in FIGS. 11 and 12), a raised angular rotated notebook orientation (shown in FIG. 13), a raised rear viewing orientation (shown in FIG. 14), a lowered horizontal tablet position or orientation (shown in FIG. 15) and a lowered closed position in which the display screen faces keys 724 (shown in FIG. 16), all while the display 722 remains connected and attached to deck 720. In another implementation, mount 726 may alternatively comprise mount 226 described above.

Mount 726 extends from deck 720 between front end 734 and rear end 738 and between keys 724 and antennas 728. As a result, mount 726 causes less interference with the performance of antennas 728, even when mount 726 includes one or more metallic or other RF blocking components. Likewise, display 722, regardless of whether display 722 is in a notebook orientation or a tablet orientation, minimally interferes with the performance of antenna 728. In one implementation, a rearward most side of mount 726 is located forwardly (towards palm rest 732) of the rear end 738 of deck 720 by at least 15 mm.

Figure 17:
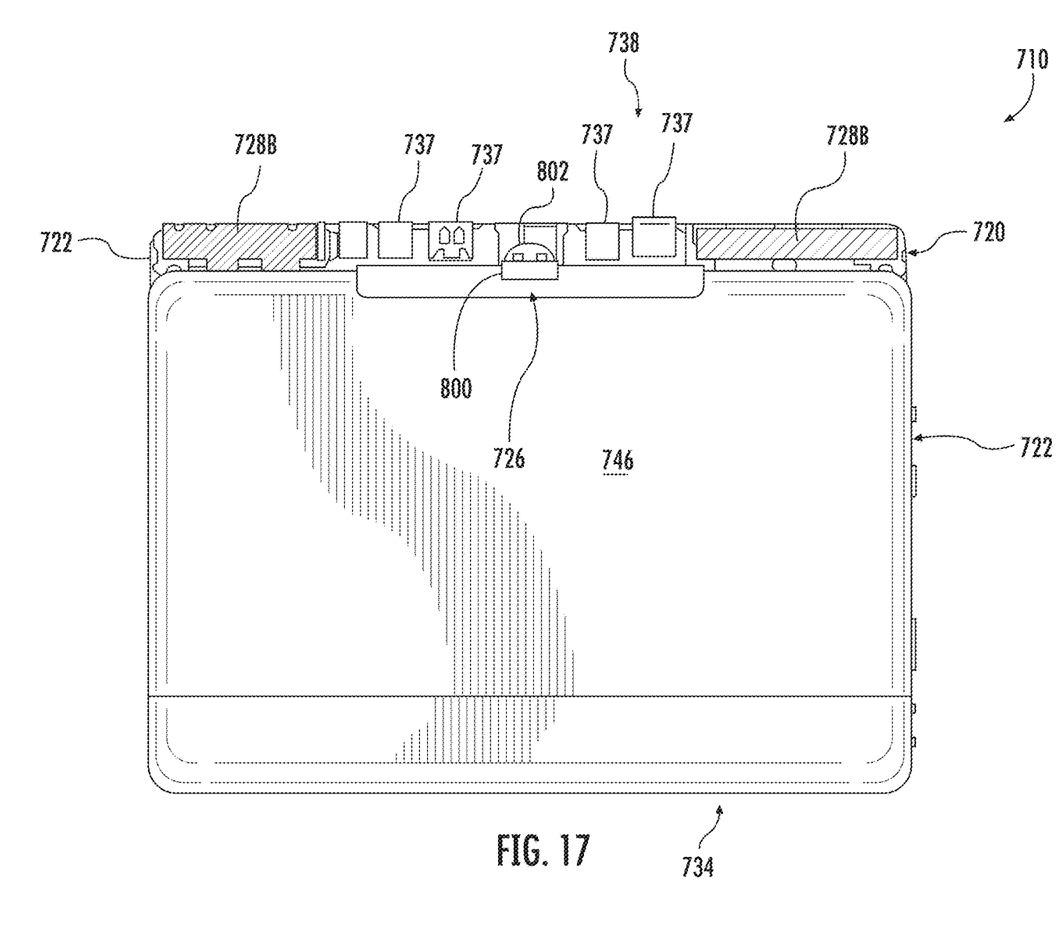
FIG. 17 is a top view of the computing system of FIG. 11 with the example display in a lowered closed position and with rear portions of a deck shown in section.

Antennas 728 comprise a main antenna (antenna 728A) and an auxiliary antenna (antenna 728B). Antennas 728 comprise devices to receive and transmit wireless signals for the transmission of data to and from computing system 710. In one implementation, each of antennas 728 comprises a radiofrequency (RF) antenna. In one implementation, antennas 728 are configured for use in a wireless local area network (WLAN). In one implementation, antennas 728 are also configured for use in a wireless wide area network (WWAN). Antennas 728 are supported within housing extension 736 of deck housing 720 such that antennas 728 extend outwardly beyond any display that is retained by mount 726 in the tablet orientation. Antennas 728 extend on opposite sides of ports 737.

Figure 12:
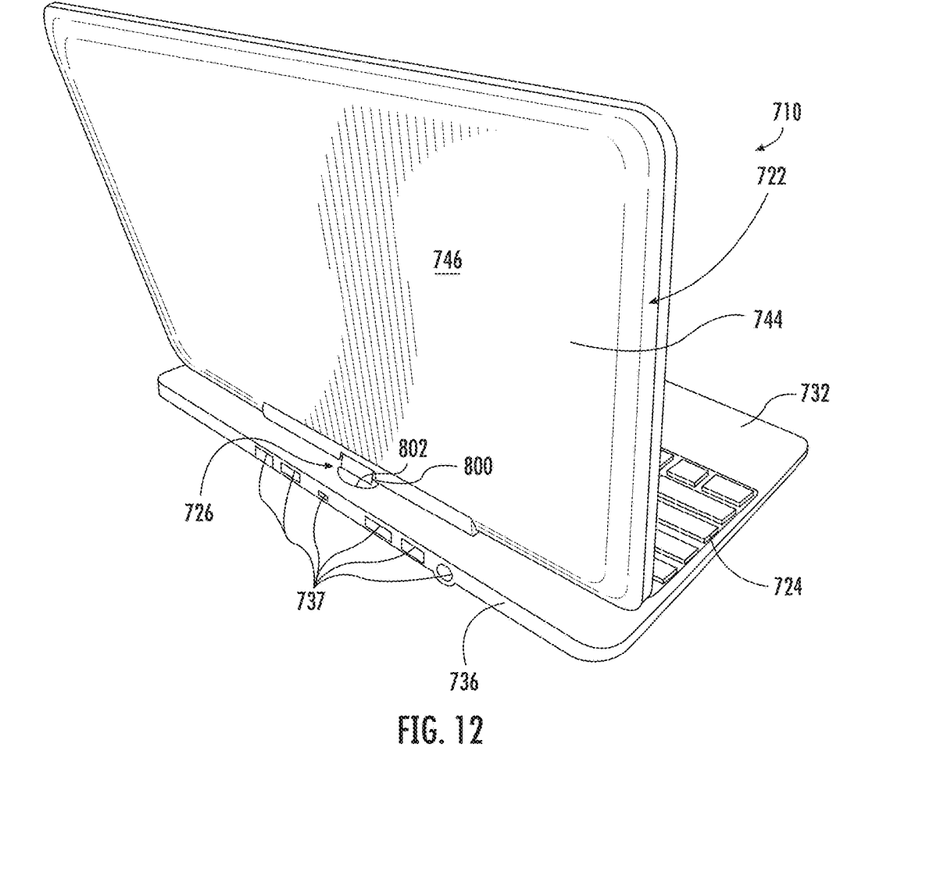
FIG. 12 is a rear perspective view of the computing system of FIG. 11.
Figure 13:
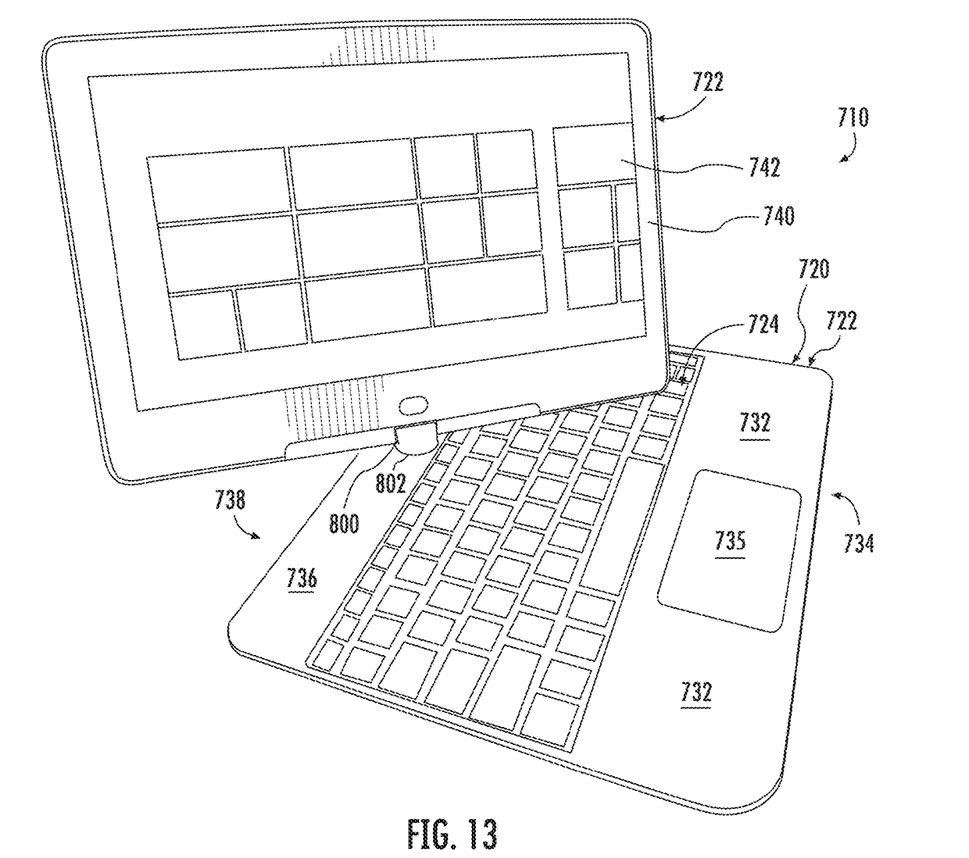
FIG. 13 is a front perspective view of the computing system of FIG. 11 with the example display in a raised and rotated notebook position.
Figure 14:
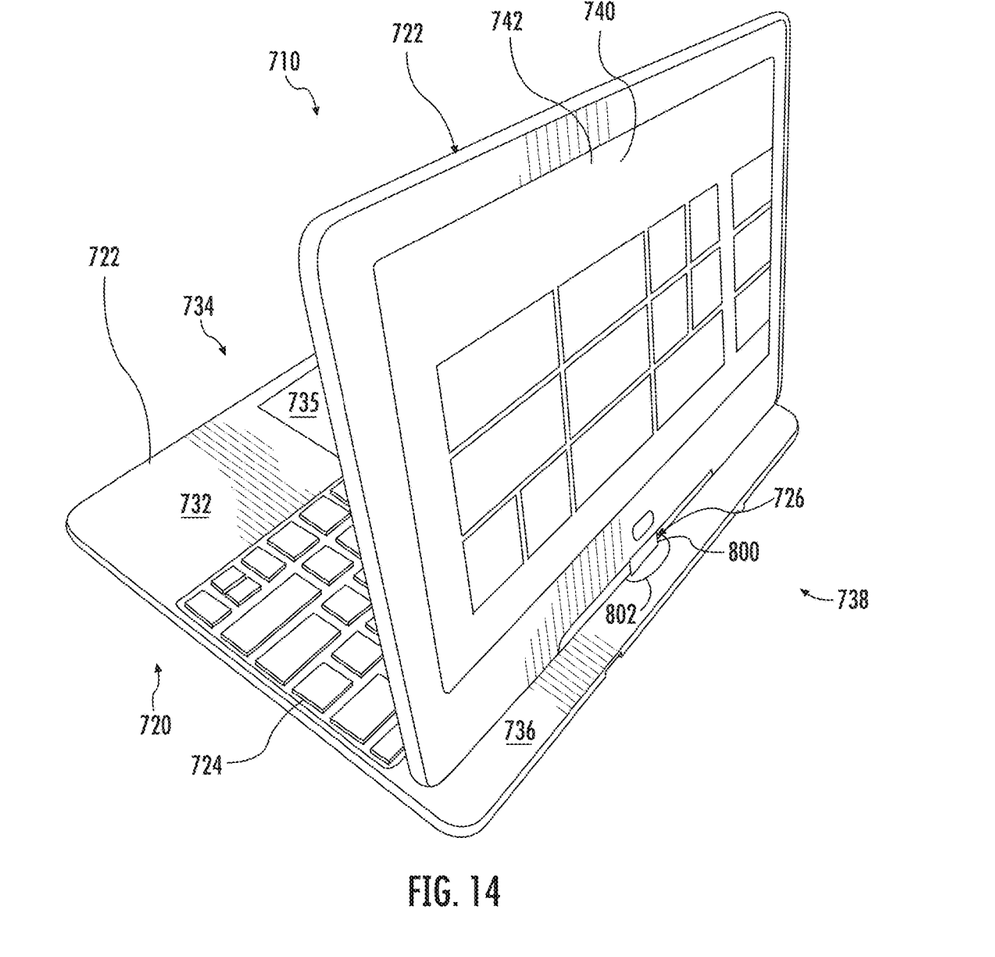
FIG. 14 is a rear perspective view of the computing system of FIG. 11 with the example display in a rear viewing position.
Figure 15:
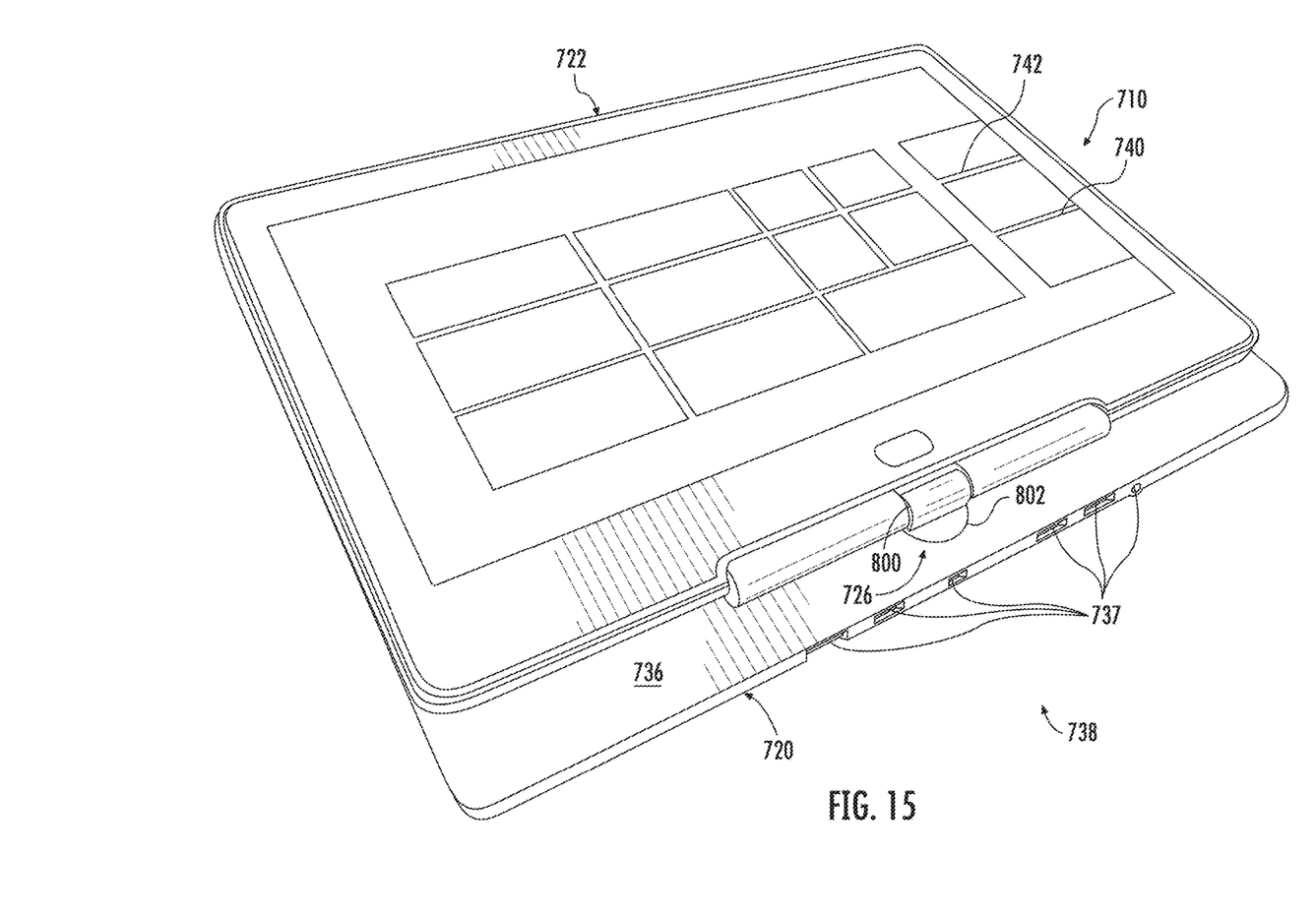
FIG. 15 is a rear perspective view of the computing system of FIG. 11 with the example display in a lowered horizontal tablet position.
Figure 16:
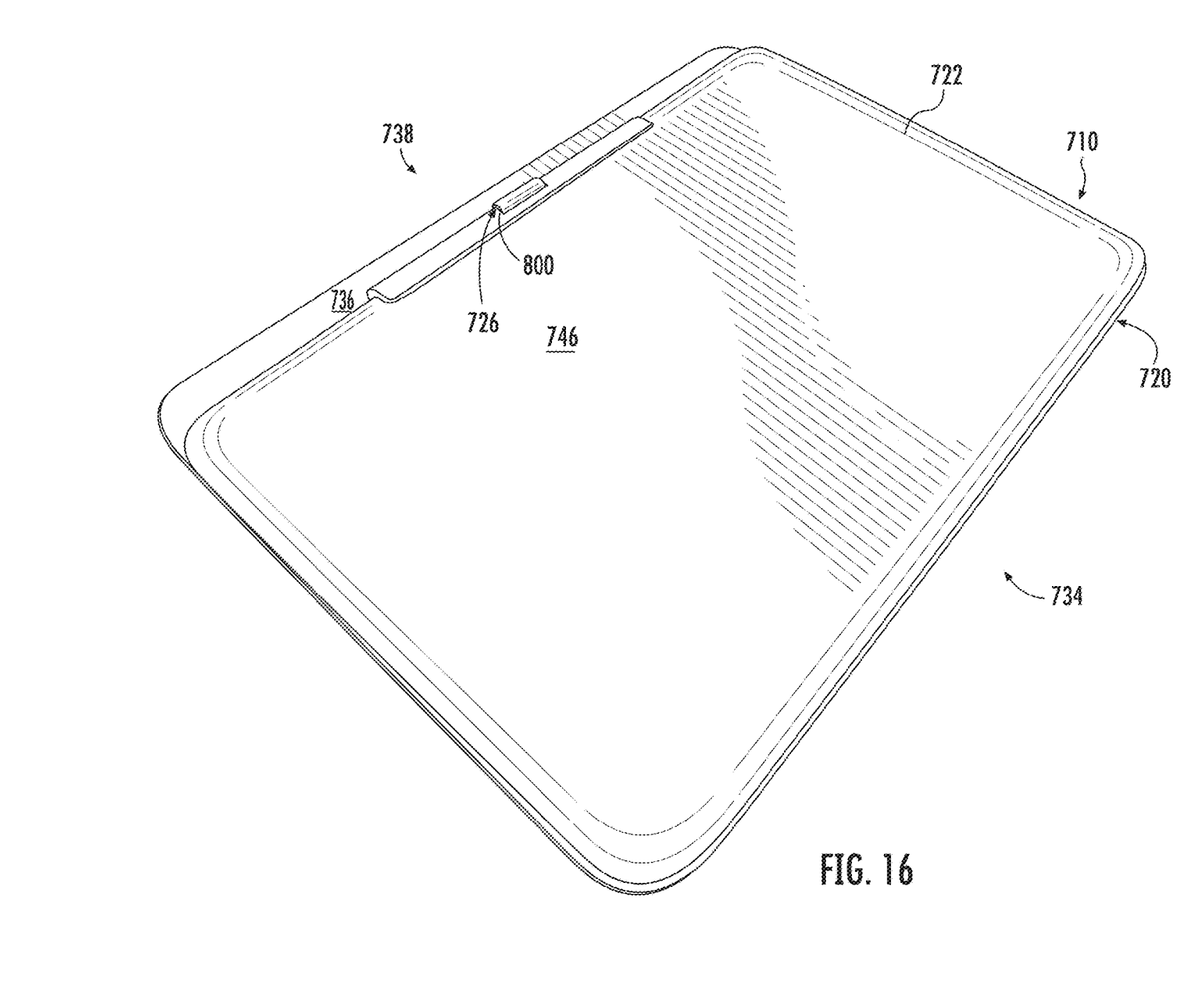
FIG. 16 is a front perspective view of the computing system of FIG. 11 with the example display in a lowered closed position.

In the example illustrated, antennas 728 are located proximate rear end 738 of housing 720, away from a person when the person is using computing system 710 in the raised notebook orientation (shown in FIGS. 11-13). In the example illustrated, antennas 728 are completely surrounded and enclosed by housing extension 736. In another implementation, antennas 728 may be at least partially exposed through walls of housing extensions 736.

Display 722 comprises a panel comprising a front or top face display screen 742 with a display screen 742 and a rear face 744 comprising a rear display housing 746. Display 722 is movably connected to deck 720 by mount 726 at a location forward of rear end 38 of deck 722, between antennas 728 and keys 724. In one implementation, display screen 742 comprises a liquid crystal display. In other implementations, display screen 742 and comprise other video display technologies. In the example illustrated, rear display housing 746 on rear face 744 is formed from a metallic material. In yet other implementations, rear display housing 746 may be formed from other materials. Because deck 720 supports antennas 728 at locations outwardly beyond the display 722 when the display 722 is supported by mount 726 in the lowered horizontal tablet orientation or position, antennas 728 are not covered by display and performance of antennas 728 is not degraded by metallic or other RF blocking materials of the display screen. In addition, antennas 728 are not sandwiched between the display and any underlying RF blocking housing walls or electronics proximate palm rest 732 (shown in FIG. 11) or other portions of deck 720.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a display comprising a display screen;
   a deck comprising:
      keys; and
      a mount to support the display in a raised position and a lowered horizontal position, wherein the display screen is to face away from the deck in the lowered horizontal position; and
   an antenna within the deck at a location so as to extend outwardly beyond the display when the display is in the lowered horizontal position.

2. The apparatus of claim 1, wherein the display moves between the raised position and the lowered horizontal position while the display screen remains connected to the deck.

3. The apparatus of claim 1, where the display is separable from the deck for repositioning of the display in the raised position or the lowered horizontal position.

4. The apparatus of claim 1, wherein the display extends from the deck between the keys and the location of the antenna.

5. The apparatus of claim 1, wherein the antenna extends at least 10 mm outwardly beyond the display when the display is in the lower horizontal position.

6. The apparatus of claim 1, wherein the mount comprises a hinge and swivel mechanism at the rear of the deck the hinge and swivel mechanism movably connecting the display to the deck for pivotal movement about a vertical axis and pivotal movement about a horizontal axis, wherein the antenna extends rearwardly of the hinge and swivel mechanism.

7. The apparatus of claim 6 further comprising an auxiliary antenna within the deck, the auxiliary antenna extending rearwardly of the hinge and swivel mechanism on an opposite side of the hinge and swivel mechanism as the antenna.

8. The apparatus of claim 1, wherein the deck has an outer deck housing comprising a portion containing the antenna and wherein the portion of the outer deck housing containing the antenna extends at least 10 mm outwardly from the display when the display is in the lowered horizontal position.

9. The apparatus of claim 1, wherein the deck has an outer deck housing comprising a portion containing the antenna, wherein the portion is formed from a radiofrequency (RF) transparent material.

10. The apparatus of claim 9, wherein the outer deck housing has a second portion containing key electronics, wherein the display has a rear display housing opposite the display screen and wherein at least one of the second portion of the outer deck housing and the rear display housing are metallic.

11. The apparatus of claim 1 further comprising an auxiliary antenna within the deck at a location so as to extend outwardly beyond the display when the display is in the lowered horizontal position.

12. The apparatus of claim 1 further comprising:
a sensor to sense positioning of the display screen with respect to the deck; and
a controller to actuate the antenna between different modes based upon a sensed positioning of the display screen.

13. An apparatus comprising:
a deck comprising keys;
a display comprising a display screen, the display repositionable with respect to the deck in a notebook orientation in which the display extends non-parallel to a deck and a tablet orientation in which the display extends over and parallel to a covered portion of the deck, wherein the display screen is to face away from the deck; and
a radiofrequency antenna within a portion of the deck uncovered by the display when the display is in the tablet orientation.

* * * * *

UNITED STATES PATENT AND TRADEMARK OFFICE
CERTIFICATE OF CORRECTION

PATENT NO. : 9,865,914 B2
APPLICATION NO. : 14/765320
DATED : January 9, 2018
INVENTOR(S) : Lim et al.

Page 1 of 1

It is certified that error appears in the above-identified patent and that said Letters Patent is hereby corrected as shown below:

On the Title Page

In Column 2, Foreign Patent Documents, Line 2, delete "0791978" and insert -- 0791878 --, therefor.

In the Claims

In Column 10, Line 56, in Claim 6, delete "deck" and insert -- deck, --, therefor.

Signed and Sealed this
Seventeenth Day of April, 2018

Andrei Iancu
*Director of the United States Patent and Trademark Office*